United States Patent
Wu (10) Patent No.: US 12,506,828 B2
(45) Date of Patent: Dec. 23, 2025

(54) MOBILE PHONE AND MOBILE PHONE FRAGRANCE ACCESSORY SET

(71) Applicant: Blueprint Technology CO., LTD., Taipei (TW)

(72) Inventor: Hua Ting Wu, Taipei (TW)

(73) Assignee: Blueprint Technology CO., LTD., Taipei (TW)

( * ) Notice: Subject to any disclaimer, the term of this patent is extended or adjusted under 35 U.S.C. 154(b) by 55 days.

(21) Appl. No.: 18/612,657

(22) Filed: Mar. 21, 2024

(65) Prior Publication Data
US 2025/0233935 A1    Jul. 17, 2025

(30) Foreign Application Priority Data
Jan. 12, 2024    (TW) ................. 113200425

(51) Int. Cl.
*A45F 5/00* (2006.01)
*H04M 1/21* (2006.01)

(52) U.S. Cl.
CPC ................. *H04M 1/21* (2013.01); *A45F 5/00* (2013.01); *A45F 5/1516* (2025.01)

(58) Field of Classification Search
CPC .................................... H04M 1/21; A45F 5/00
See application file for complete search history.

(56) References Cited

U.S. PATENT DOCUMENTS

| | | | | |
|---|---|---|---|---|
| 1,586,251 A | * | 5/1926 | Lang ...................... | G10G 5/005 224/268 |
| 1,680,551 A | * | 8/1928 | King ...................... | F16B 45/023 24/598.5 |
| 2,005,569 A | * | 6/1935 | Smith ...................... | A41F 15/02 24/304 |
| 2,019,691 A | * | 11/1935 | Morehouse ........... | F16B 45/036 70/456 R |
| 2,284,069 A | * | 5/1942 | Robertson ............... | G10G 5/005 224/268 |
| 3,079,657 A | * | 3/1963 | Russell ..................... | B60P 7/04 24/373 |
| 4,168,022 A | * | 9/1979 | Brewer ..................... | A45F 5/00 396/428 |
| 4,386,724 A | * | 6/1983 | Kotler .................... | A45C 13/26 224/901.4 |

(Continued)

FOREIGN PATENT DOCUMENTS

| | | |
|---|---|---|
| JP | 3245245 U | 1/2024 |
| TW | M640635 U | 5/2023 |

(Continued)

*Primary Examiner* — Jason W San
(74) *Attorney, Agent, or Firm* — BACON&THOMAS,PLLC (57) ABSTRACT

A mobile phone and mobile phone fragrance accessory includes a mobile phone and a mobile phone fragrance accessory having a fixing component and a fragrance component; the fixing component has a first connecting part, located at the edge of the fixing component; the fragrance component is installed within the fixing component and provides fragrance functionality; the first connecting part is adapted for mounting on the mobile phone, allowing the mobile phone fragrance accessory to be conveniently combined with the mobile phone for use, thereby enhancing the convenience of usage of the mobile phone fragrance accessory.

6 Claims, 10 Drawing Sheets

(56) References Cited

U.S. PATENT DOCUMENTS

| | | | | |
|---|---|---|---|---|
| D270,468 S * | 9/1983 | Hoyt | | D23/369 |
| 4,471,509 A * | 9/1984 | Marks | | G02C 11/02 |
| | | | | 24/299 |
| 5,136,640 A * | 8/1992 | Kim | | H04M 1/21 |
| | | | | 379/439 |
| 5,220,636 A * | 6/1993 | Chang | | A61L 9/03 |
| | | | | 392/390 |
| 5,459,903 A * | 10/1995 | Treacy | | A61J 9/0638 |
| | | | | 24/301 |
| 6,138,356 A * | 10/2000 | Hertelendy | | A44C 15/00 |
| | | | | 63/4 |
| 6,907,877 B2 * | 6/2005 | Balogh, II | | A45F 5/00 |
| | | | | 128/200.23 |
| D565,715 S * | 4/2008 | Wu | | D23/366 |
| D583,037 S * | 12/2008 | Kenny | | D23/366 |
| 8,205,471 B2 * | 6/2012 | McLees | | A44C 5/2095 |
| | | | | 63/3.1 |
| 8,295,533 B1 * | 10/2012 | Schachtman | | A45F 5/00 |
| | | | | 381/385 |
| D804,810 S * | 12/2017 | Schmiedeberg | | D3/215 |
| 11,058,190 B2 * | 7/2021 | Nam | | A44C 15/005 |
| 11,211,963 B1 * | 12/2021 | Cunningham | | A45F 5/00 |
| 11,224,267 B1 * | 1/2022 | Rudnick | | A44C 15/005 |
| 11,246,386 B1 * | 2/2022 | Williams | | A44C 15/0055 |
| D963,823 S * | 9/2022 | Funk | | D23/366 |
| D966,922 S * | 10/2022 | Feng | | D11/13 |
| 11,653,731 B2 * | 5/2023 | Balmer | | F16M 11/041 |
| | | | | 224/576 |
| 11,930,897 B1 * | 3/2024 | Rudnick | | A44C 5/209 |
| 2002/0104861 A1 * | 8/2002 | Kerjean | | A45F 5/00 |
| | | | | 224/220 |
| 2002/0108978 A1 * | 8/2002 | Koxlien | | A01M 31/006 |
| | | | | 224/264 |
| 2004/0007017 A1 * | 1/2004 | Flaherty | | A44C 15/005 |
| | | | | 63/3.1 |
| 2004/0200236 A1 * | 10/2004 | Emberson | | A44C 15/00 |
| | | | | 63/23 |
| 2006/0126444 A1 * | 6/2006 | Ellner | | A45F 5/00 |
| | | | | 368/246 |
| 2007/0220717 A1 * | 9/2007 | Brinson | | A45F 5/02 |
| | | | | 24/298 |
| 2007/0278265 A1 * | 12/2007 | Contente | | A45F 5/00 |
| | | | | 224/604 |
| 2010/0206925 A1 * | 8/2010 | Fielding, Jr. | | A45F 5/00 |
| | | | | 224/257 |
| 2011/0006090 A1 * | 1/2011 | Bollard | | A45F 5/00 |
| | | | | 224/257 |
| 2011/0101053 A1 * | 5/2011 | Liang | | A45F 5/02 |
| | | | | 224/257 |
| 2012/0091176 A1 * | 4/2012 | Samuel | | A45F 5/00 |
| | | | | 224/257 |
| 2012/0324946 A1 * | 12/2012 | Latouf | | A44C 15/005 |
| | | | | 63/1.13 |
| 2013/0091894 A1 * | 4/2013 | Brown | | A44C 13/00 |
| | | | | 63/3.1 |
| 2014/0042197 A1 * | 2/2014 | Skenderian | | A45F 5/00 |
| | | | | 224/257 |
| 2014/0204513 A1 * | 7/2014 | Del Padre | | H04M 1/21 |
| | | | | 239/289 |
| 2015/0048178 A1 * | 2/2015 | Edwards | | G06F 3/011 |
| | | | | 239/128 |
| 2015/0156301 A1 * | 6/2015 | Crawford | | H04M 1/724092 |
| | | | | 455/420 |
| 2016/0213059 A1 * | 7/2016 | South | | A45F 5/004 |
| 2017/0086541 A1 * | 3/2017 | Welch | | A44C 15/0055 |
| 2017/0234858 A1 * | 8/2017 | Depa | | B01L 3/52 |
| | | | | 436/165 |
| 2017/0359452 A1 * | 12/2017 | Enojado | | H04M 1/04 |
| 2018/0055292 A1 * | 3/2018 | Douglas | | A47K 5/1201 |
| 2018/0360168 A1 * | 12/2018 | Bennett | | H04N 23/57 |
| 2019/0281932 A1 * | 9/2019 | Nam | | A44C 15/005 |
| 2020/0253362 A1 * | 8/2020 | Ruddy | | A45F 5/00 |
| 2020/0383456 A1 * | 12/2020 | Henderson | | A45D 34/00 |
| 2021/0046885 A1 * | 2/2021 | Jankura | | F16B 2/04 |
| 2021/0083711 A1 * | 3/2021 | Miles, Jr. | | H04M 1/185 |
| 2021/0127802 A1 * | 5/2021 | Erickson | | A44C 11/005 |
| 2022/0190865 A1 * | 6/2022 | Jung | | A45C 11/00 |
| 2024/0074552 A1 * | 3/2024 | Ottaway | | A44C 15/005 |
| 2024/0283856 A1 * | 8/2024 | Hsu | | A61L 9/12 |
| 2024/0373997 A1 * | 11/2024 | Xi | | A44C 11/00 |
| 2024/0374774 A1 * | 11/2024 | Wu | | A61L 9/12 |
| 2025/0000214 A1 * | 1/2025 | Hopkins | | A44B 9/16 |
| 2025/0185795 A1 * | 6/2025 | Thompson | | A45F 5/00 |
| 2025/0195710 A1 * | 6/2025 | Wu | | A61L 9/12 |
| 2025/0222154 A1 * | 7/2025 | Wu | | A61L 9/12 |

FOREIGN PATENT DOCUMENTS

| | | | | |
|---|---|---|---|---|
| TW | | M640657 U | | 5/2023 |
| TW | | M640661 U | | 5/2023 |
| TW | | M646307 U | | 9/2023 |
| TW | | M646708 U | | 10/2023 |
| TW | | M648104 U | | 11/2023 |
| TW | | M648105 U | | 11/2023 |
| TW | | M648142 U | | 11/2023 |
| TW | | M648147 U | | 11/2023 |
| WO | WO-2022055135 A1 * | 3/2022 | | A45C 11/002 |

* cited by examiner

MOBILE PHONE AND MOBILE PHONE FRAGRANCE ACCESSORY SET

CROSS-REFERENCE TO RELATED APPLICATIONS

This application claims the priority benefit of TW application serial No. 113200425, filed on Jan. 12, 2024. The entirety of the above-mentioned patent application is hereby incorporated by reference herein and made a part of specification.

BACKGROUND OF THE INVENTION

1. Field of the Invention

The present invention relates to a fragrance accessory, and more particularly to a mobile phone fragrance accessory.

2. Description of the Related Art

With increasing popularity and acceptance, fragrance products are widely used in people's daily lives. For example, fragrance candles placed in bedrooms improve the scent of the environment while also influencing the user's senses through aroma, easing user's emotions. Alternatively, fragrance diffusers placed in home environments provide fragrance function while also generating mist to offer humidifying functions.

However, the aforementioned fragrance candles and diffusers are mostly used in indoor environments and are not easily portable, making it inconvenient for users to enjoy fragrance function. Therefore, there is still room for improvement in current fragrance products.

SUMMARY OF THE INVENTION

An objective of the present invention is to provide a mobile phone fragrance accessory that is connected to the mobile phone easily, improving the usage convenience of fragrance products.

To achieve the foregoing objective, the mobile phone and mobile phone fragrance accessory set includes:
a mobile phone; and
a mobile phone fragrance accessory having:
  a fixing component, having a first connecting part located at an edge of the fixing component; and
  a fragrance component, mounted within the fixing component and providing fragrance functionality;
  wherein the first connecting part is connected to the mobile phone;
wherein the fixing component includes:
  a first surface;
  a second surface, opposite to the first surface;
  a mounting hole, penetrating the first surface and the second surface; wherein the fragrance component is mounted within the mounting hole; and
wherein a surface of the fragrance component aligns with the first surface, and another surface of the fragrance component aligns with the second surface, such that the two surfaces of the fragrance component are respectively exposed to and are capable of emitting fragrance to an exterior of the fixing component through the first surface and the second surface.

The mobile phone fragrance accessory connects to the mobile phone through the first connecting part. Compared to traditional fragrance candles and diffusers that are not easily portable, the mobile phone fragrance accessory conveniently attaches to the mobile phone, addressing the issue of traditional fragrance products being too bulky or limited in usage and difficult to be carried around. The mobile phone fragrance accessory of the present invention enhances the convenience of using fragrance products, making it more convenient for users to enjoy fragrance functions through this mobile phone fragrance accessory.

Other objectives, advantages and novel features of the invention will become more apparent from the following detailed description when taken in conjunction with the accompanying drawings.

DETAILED DESCRIPTION OF THE INVENTION

Figure 1:
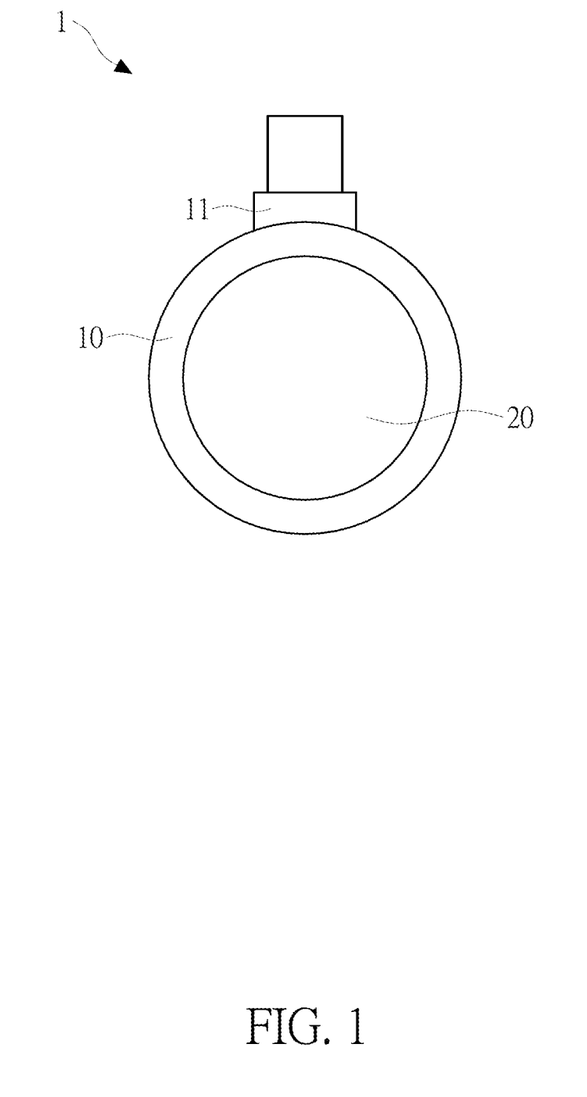
FIG. 1 is an external schematic view of the mobile phone fragrance accessory in the first embodiment of the invention.
Figure 2:
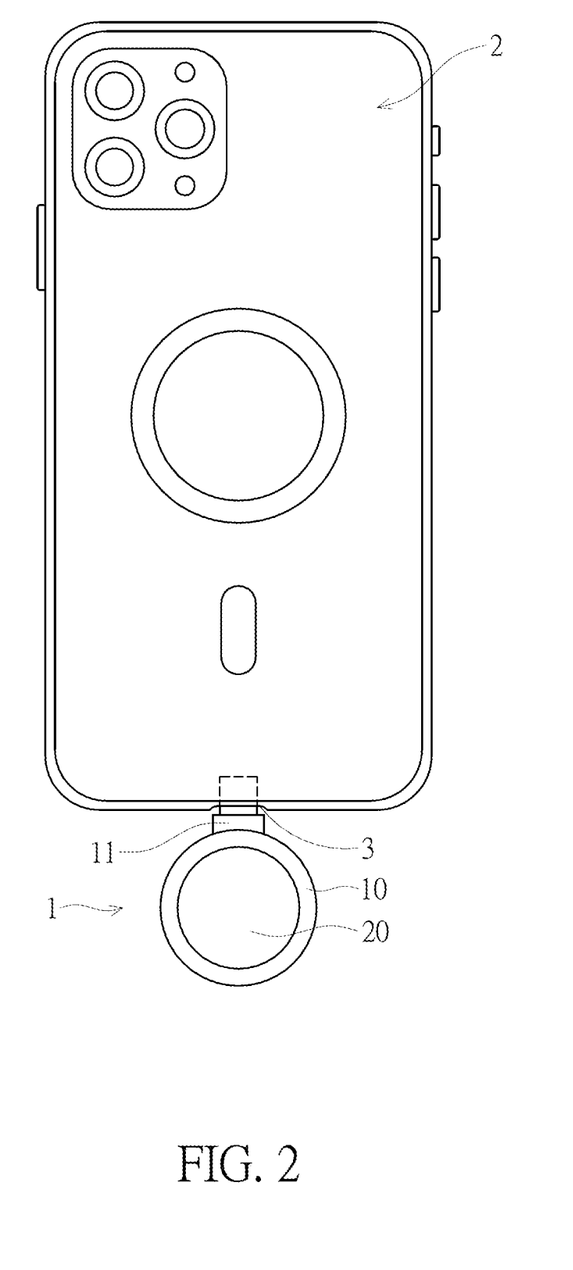
FIG. 2 is a schematic view of the mobile phone fragrance accessory combined with a mobile phone in the first embodiment of the invention.
Figure 3:
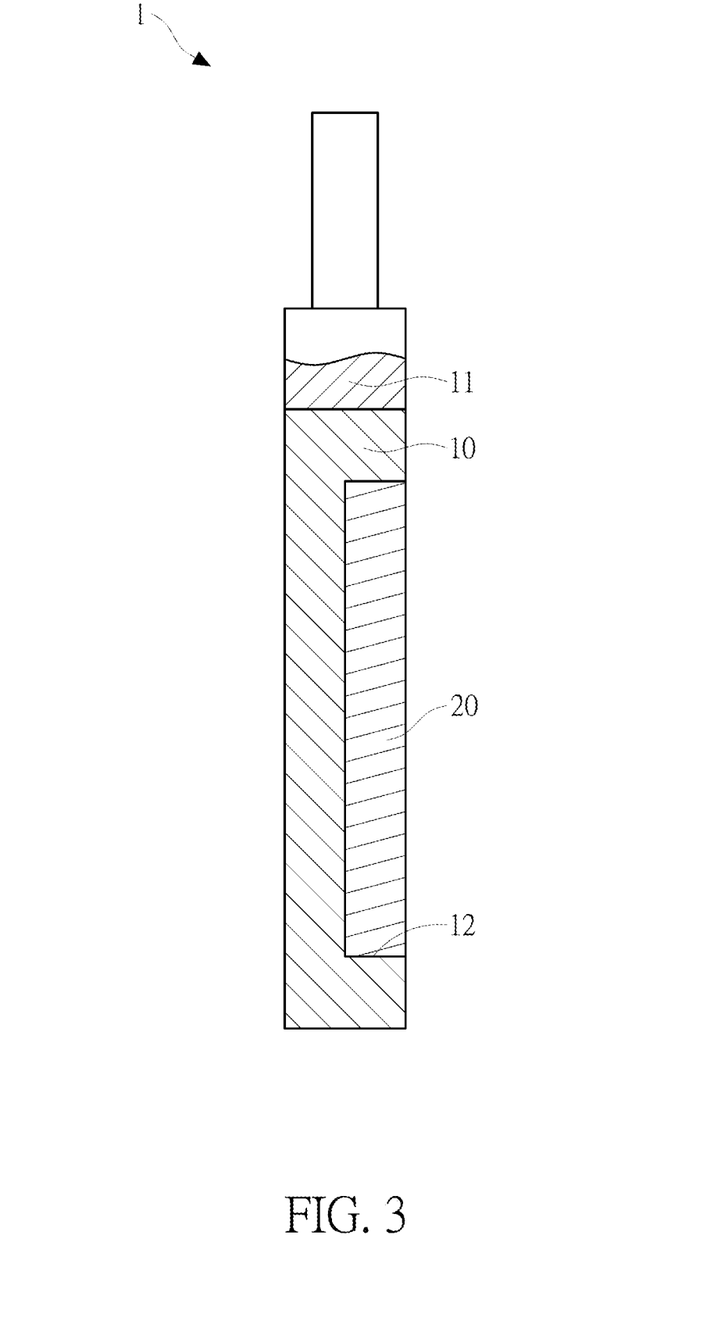
FIG. 3 is a cross-sectional schematic view of the mobile phone fragrance accessory in the first embodiment of the invention.

FIGS. 1 to 3 are schematic views of the first embodiment of the present invention of the mobile phone fragrance accessory 1, which is for use on a mobile phone 2. The mobile phone fragrance accessory 1 includes a fixing component 10 and a fragrance component 20. The fixing component 10 is used to secure and mount the fragrance component 20. The fragrance component 20 may be made from at least one material capable of adsorbing fragrance oils, such as paper, bamboo, rattan, gypsum, ceramics, diatomaceous earth, wood, fabric, lava, and crystal. Furthermore, the fragrance component 20 can restore its fragrance functionality by replenishing the fragrance oil, allowing it to repeatedly emit fragrance.

In the first embodiment, the fixing component 10 has a first connecting part 11 and an accommodation groove 12. The first connecting part 11 is located at the edge of the fixing component 10, and is shaped to fit into a charging port 3 of the mobile phone 2. The accommodation groove 12 has an opening end, and the fragrance component 20 is mounted within the accommodation groove 12 of the fixing component 10, with the fragrance component 20 exposed at the opening end of the accommodation groove 12, allowing the fragrance emitted by the fragrance component 20 to disperse through the opening end. The fragrance component 20 may also be refilled with fragrance oil through the opening end. The shape of the first connecting part 11 is identical to that of a bus connector, such as a Type-A, Micro-B, Mini-B, Type-C, or other Universal Serial Bus (USB) connectors, or a Lightning connector. The fragrance component 20 can be secured within the accommodation groove 12 using a card structure (not shown in the FIG.) or through adhesive or thermal bonding methods.

With reference to FIG. 3, the mobile phone 2 has a charging port 3. When the mobile phone fragrance accessory 1 is attached to the mobile phone 2, it connects to the mobile phone's charging port 3 through the first connecting part 11. This allows the mobile phone fragrance accessory 1 to be used along with the mobile phone 2. For example, if the mobile phone 2 has a Type-C charging port and the shape of the first connecting part 11 matches the shape of a Type-C connector, the first connecting part 11 can be inserted into the charging port 3 of the mobile phone 2, ensuring a stable attachment. It is important to note that, the first connecting part 11 is used for mechanical connection to the charging port 3 of the mobile phone 2, and does not serve a signal transmission purpose.

Figure 4:
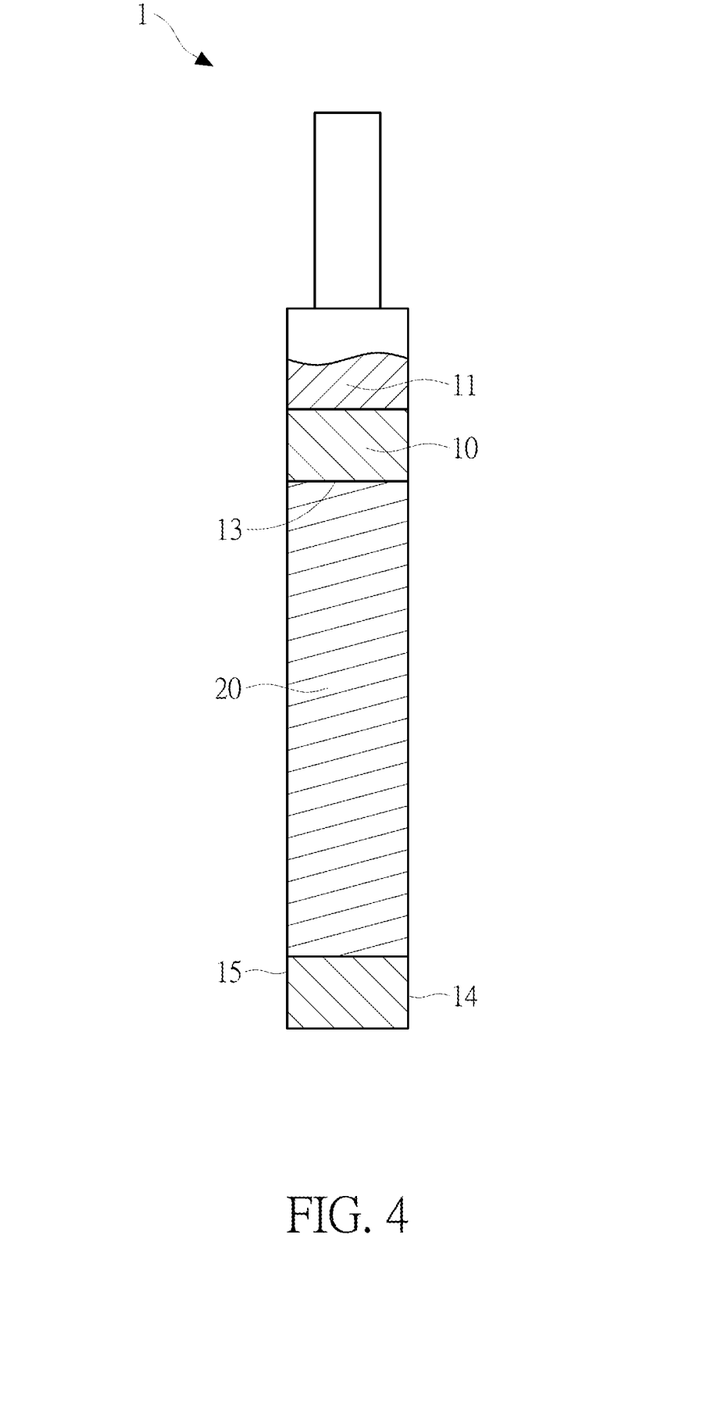
FIG. 4 is a cross-sectional schematic view of the mobile phone fragrance accessory in the second embodiment of the invention.

With reference to FIG. 4, the second embodiment of the present invention of the mobile phone fragrance accessory 1 differs from the first embodiment in that the fixing component 10 has a first surface 14, a second surface 15, and a mounting hole 13. The first surface 14 is opposite to the second surface 15, and the mounting hole 13 penetrates the first surface 14 and the second surface 15. The fragrance component 20 is mounted within the mounting hole 13, with a surface of the fragrance component 20 aligning with the first surface 14, and another surface of the fragrance component 20 aligns with the second surface 15, allowing the fragrance component 20 to be exposed through the mounting hole 13, such that fragrance can be emitted and fragrance oil can be replenished. The fragrance component 20 can be secured within the mounting hole 13 using a latch structure (not shown in the figure), adhesive glue, or thermal bonding methods.

Figure 5:
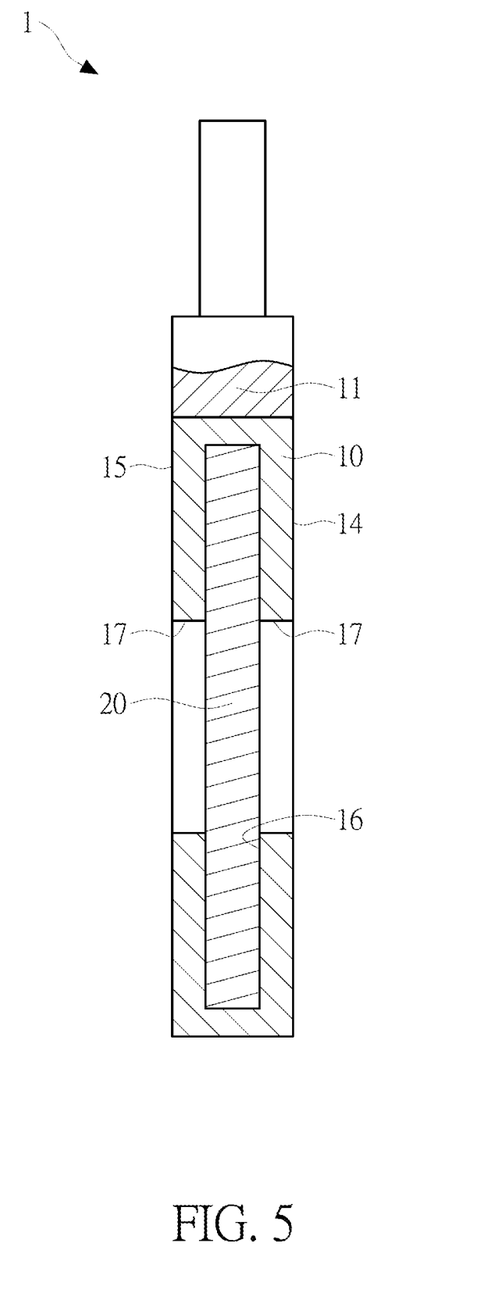
FIG. 5 is a cross-sectional schematic view of the mobile phone fragrance accessory in the third embodiment of the invention.

With reference to FIG. 5, the third embodiment of the present invention of mobile phone fragrance accessory 1 differs from the first embodiment in that the fixing component 10 has a first surface 14, a second surface 15, and an accommodation space 16 within the fixing component 10. A ventilation hole 17 is formed on both the first surface 14 and second surfaces 15, each connecting to the accommodation space 16. The fragrance component 20 is mounted within the accommodation space 16, and the fragrance can be emitted and fragrance oil can be replenished through these ventilation holes 17.

Figure 6:
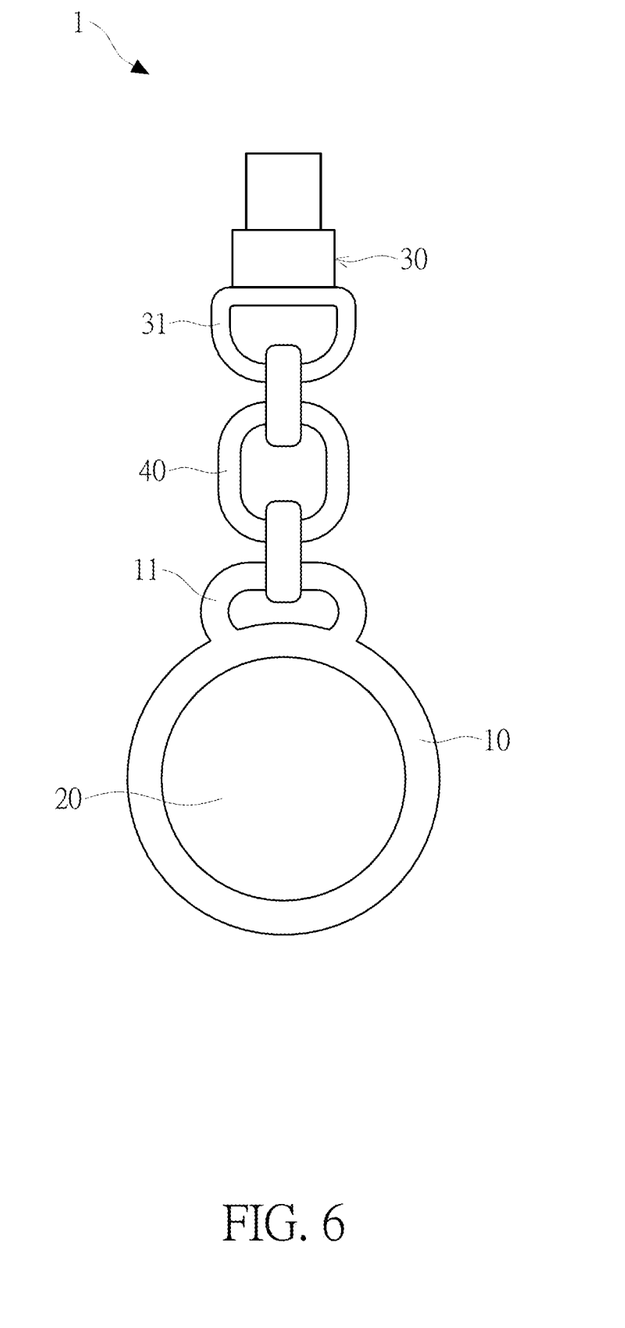
FIG. 6 is an external schematic view of the mobile phone fragrance accessory in the fourth embodiment of the invention.
Figure 7:
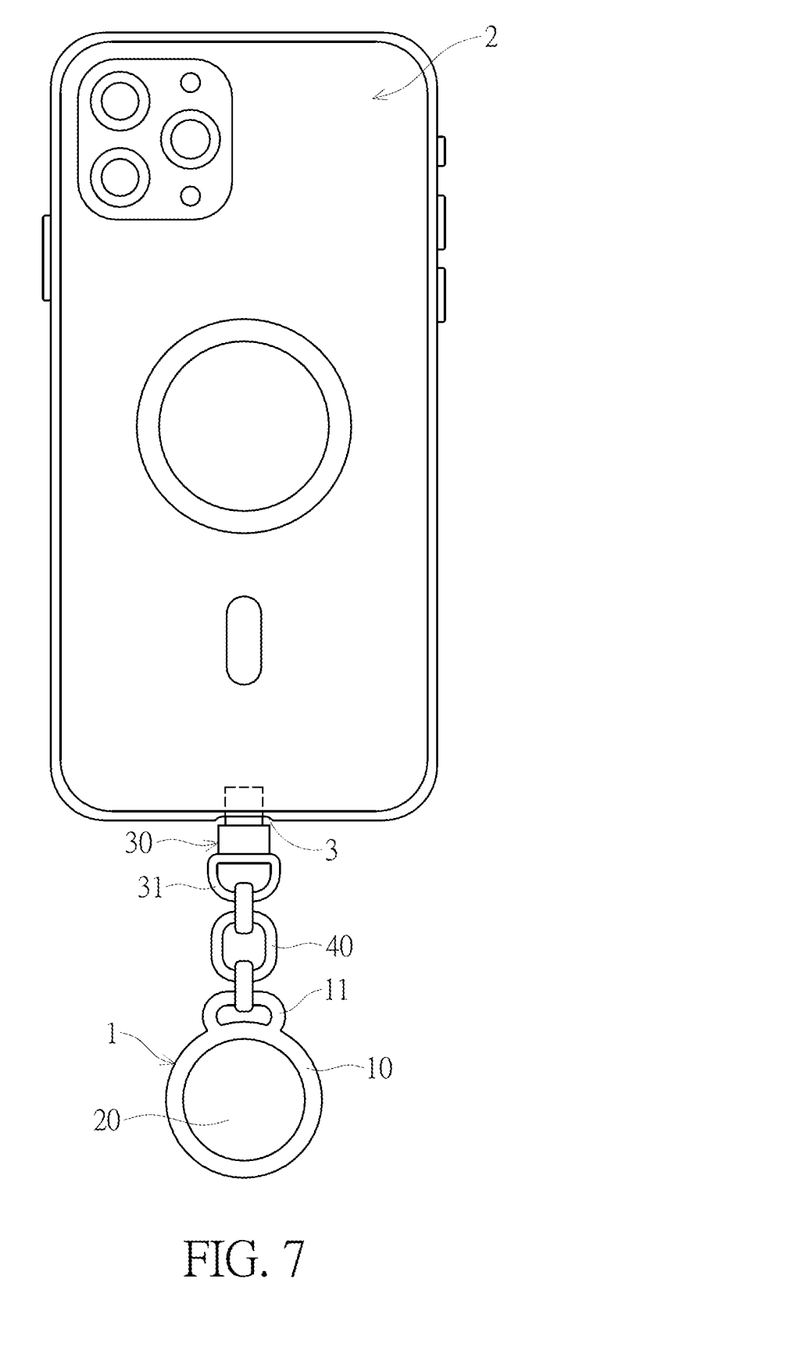
FIG. 7 is a schematic view of the mobile phone fragrance accessory combined with a mobile phone in the fourth embodiment of the invention.

With reference to FIGS. 6 and 7, the fourth embodiment of the mobile phone fragrance accessory 1 differs from the first embodiment in that the first connecting part 11 is a ring-shaped connector, and the mobile phone fragrance accessory 1 further includes a connection block 30. The shape of the connection block 30 is identical to that of a bus connector, such that it can connect to the charging port 3 of the mobile phone 2. For example, the shape of the connection block 30 can be identical to the shape of Type-A™, Micro-B™, Mini-B™, Type-C™, other USB connectors, or a Lightning™ connector. The connection block 30 has a connection ring 31, and the connection ring 31 of the connection block 30 is interconnected with the first connecting part 11 through a connection chain 40, which can be made of multiple interconnected rings. Additionally, the connection ring 31 of the connection block 30 can also be directly interconnected with the first connecting part 11.

In the fourth embodiment, when the mobile phone fragrance accessory 1 is attached to a mobile phone 2, the connection block 30 connects to the charging port 3 of the mobile phone 2, allowing the mobile phone fragrance accessory 1 to be combined to and used with the mobile phone 2. Since the connection block 30 is connected to the first connecting part 11 of the fixing component 10 through the connection chain 40, the fixing component 10, which combines the fragrance component 20, can be flexibly combined on the mobile phone 2, enhancing the convenience of using the mobile phone fragrance accessory 1. The length of the connection chain 40 can be adjusted according to the user's needs.

Figure 8:
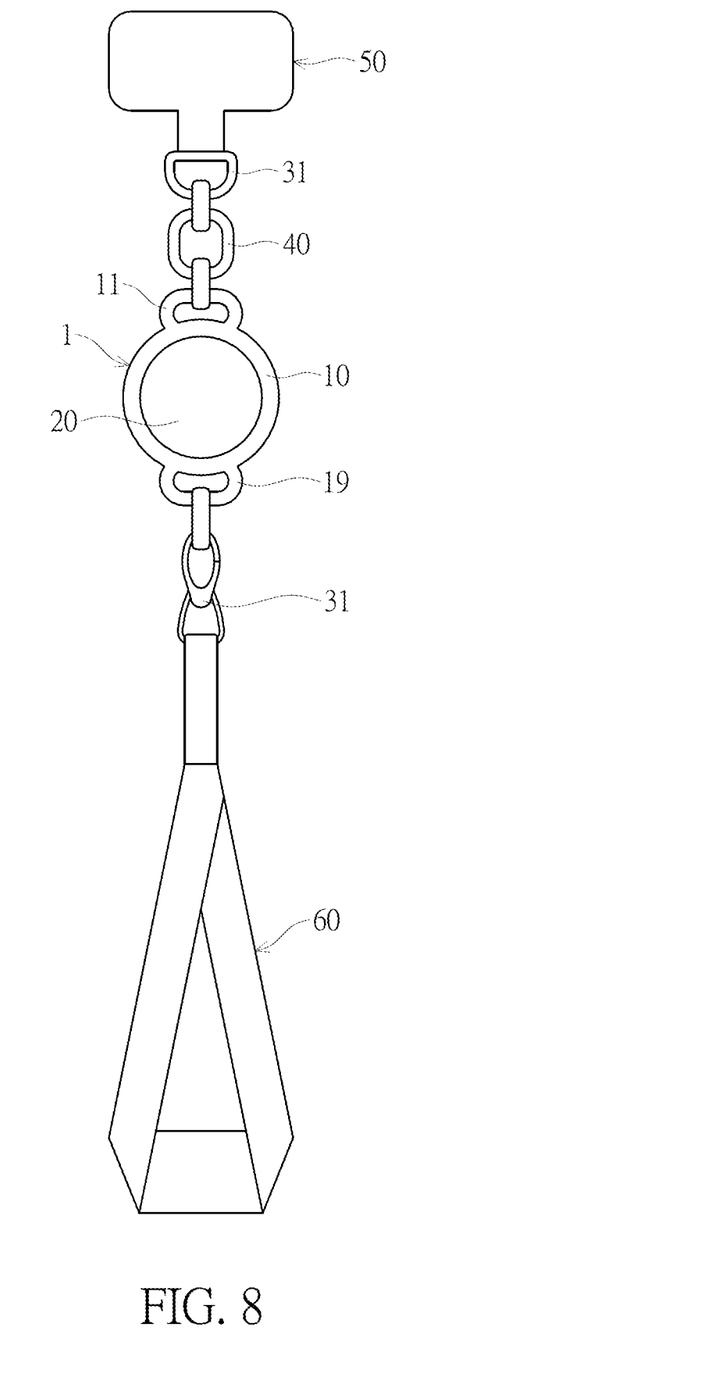
FIG. 8 is an external schematic view of the mobile phone fragrance accessory in the fifth embodiment of the invention.
Figure 9:
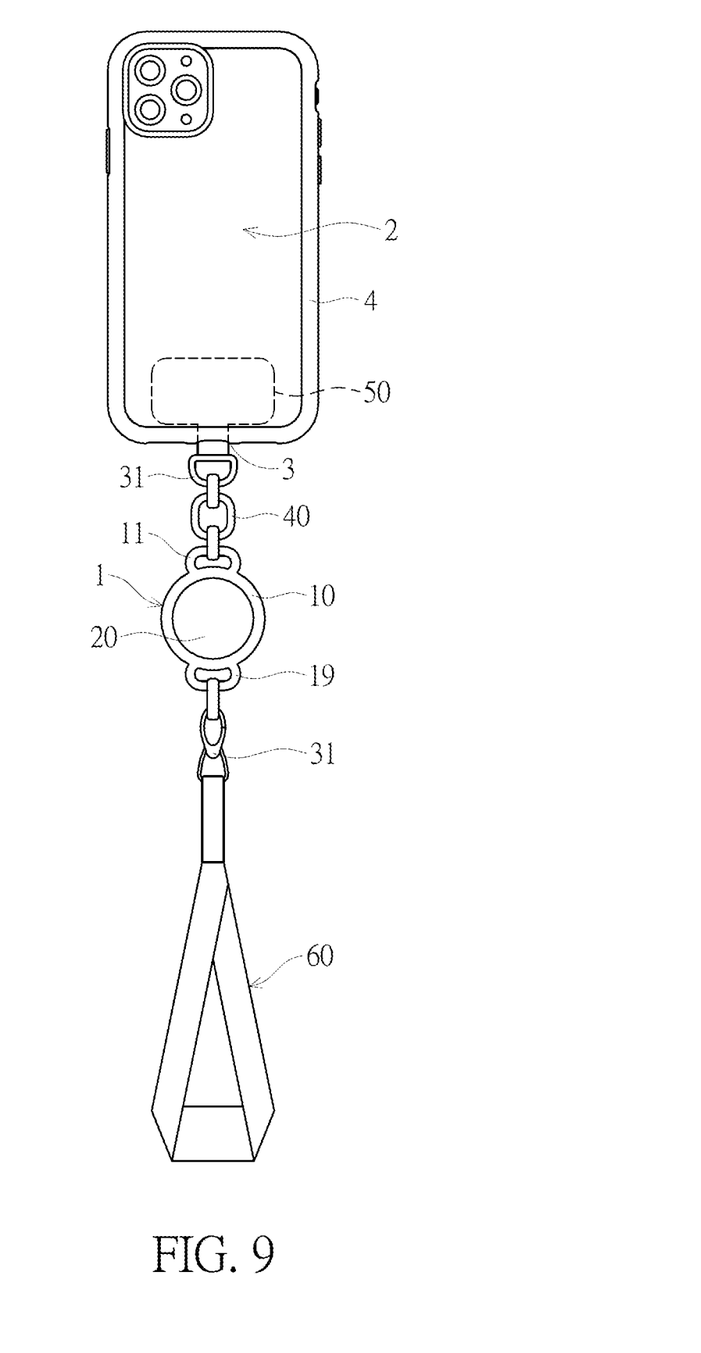
FIG. 9 is a schematic view of the mobile phone fragrance accessory combined with a mobile phone in the fifth embodiment of the invention.
Figure 10:
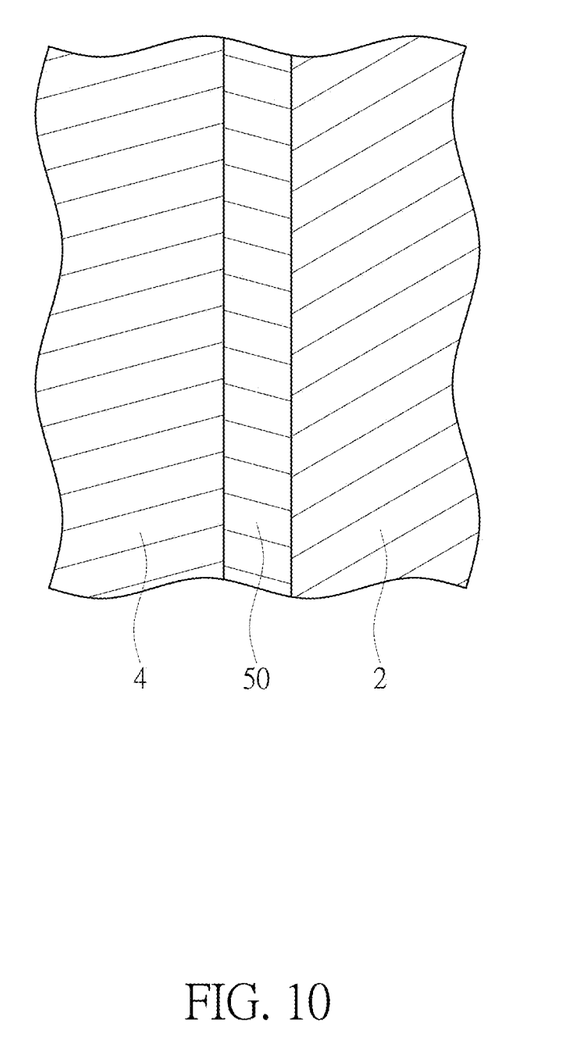
FIG. 10 is an enlarged cross-sectional view of FIG. 9, showing a phone lanyard adapter clamped by the mobile phone and a mobile phone case.

With reference to FIGS. 8 to 10, the fifth embodiment of the mobile phone fragrance accessory 1 differs from the first embodiment in that the fixing component has a first connecting part 11 and a second connecting part 19. The first connecting part 11 and the second connecting part 19 are both ring-shaped connectors. The mobile phone fragrance accessory 1 further includes a phone lanyard adapter 50 and a lanyard 60, each having a connection ring 31. The connection ring 31 of the phone lanyard adapter 50 is interconnected with the first connecting part 11 through a connection chain 40, which can be made of multiple interlinked rings. The connection ring 31 of the lanyard 60 is interconnected with the second connecting part 19 through another connection chain 40. The phone lanyard adapter 50 is designed to be clamped between the mobile phone 2 and a mobile phone case 4, with the connection ring 31 of the phone lanyard adapter 50 exposed outside the mobile phone case 4.

In the fifth embodiment, when the mobile phone fragrance accessory 1 is attached to a mobile phone 2, the phone lanyard adapter 50 is positioned between the mobile phone 2 and the mobile phone case 4, with the connection ring 31 of the phone lanyard adapter 50 threading out from the mobile phone case 4 at a position corresponding to the charging port 3. Since the phone lanyard adapter 50 is fixed between the mobile phone 2 and the mobile phone case 4, the mobile phone fragrance accessory 1 can be used together with the mobile phone 2. The connection of the connection ring 31 of the phone lanyard adapter 50 to the first connecting part 11 of the fixing component 10 through the connection chain 40 allows the fixing component 10, which combines the fragrance component 20, to be flexibly positioned on the mobile phone 2, enhancing the convenience of using the mobile phone fragrance accessory 1. Additionally, the user can hang the mobile phone 2 on their neck, shoulder, wrist, or a hook using the lanyard 60 connected to the second connecting part 19. The length of each connection chain 40 can be adjusted according to the user's needs.

The mobile phone fragrance accessory 1 of the present invention is connected to the charging port 3 of the mobile phone 2 through the first connecting part 11, through the connection block 30 that connects to the first connecting part 11, or via the phone lanyard adapter 50, which connects to the first connecting part 11 and is mounted between the mobile phone 2 and the mobile phone case 4, such that the mobile phone fragrance accessory 1 can be combined with the mobile phone 2 for use. Compared to traditional fragrance candles and diffusers, which are not easily portable, the convenient attachment of the mobile phone fragrance accessory 1 to the mobile phone 2 addresses the issue of traditional fragrance products being difficult to carry due to their size or the limitations of their use methods, thereby improving the convenience of fragrance products usage.

Furthermore, while providing a fragrance function, the mobile phone fragrance accessory 1 does not affect the feel of holding the phone, neither does it increase the overall thickness of the mobile phone 2. As the mobile phone fragrance accessory 1 connects to the charging port 3 of the mobile phone 2 or is mounted between the mobile phone 2 and the mobile phone case 4, users can easily set up or remove the mobile phone fragrance accessory 1 according to their needs, enhancing flexibility to the use of the mobile phone fragrance accessory 1 while not being influenced by the mobile phone case 4 when installed.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A mobile phone and mobile phone fragrance accessory set, comprising:
   a mobile phone, and
   a mobile phone accessory having:
      a fixing component, having a first connecting part located at an edge of the fixing component; and
      a fragrance component, mounted within the fixing component and providing fragrance functionality; wherein the first connecting part is connected to the mobile phone,
   wherein the fixing component includes:
      a first surface;
      a second surface, opposite to the first surface;
      a mounting hole, penetrating the first surface and the second surface;
   wherein the fragrance component is mounted within the mounting hole, and
   wherein a surface of the fragrance component aligns with the first surface of the fixing component, and another surface of the fragrance component aligns with the second surface of the fixing component, such that the two surfaces of the fragrance component are respectively exposed to and are capable of emitting fragrance to an exterior of the fixing component.

2. The mobile phone and mobile phone fragrance accessory set as claimed in claim 1, wherein the shape of the first connecting part is identical to the shape of a bus connector, and the first connecting part is connected to a charging port of the mobile phone.

3. The mobile phone and mobile phone fragrance accessory set as claimed in claim 1, further comprising:
   a connection block, having a connection ring, wherein the connection block is connected to a charging port of the mobile phone; wherein
   the first connecting part is a ring-shaped connecting part, and the fixing component is connected to the mobile phone through the connection block which is connected by the first connecting part.

4. The mobile phone and mobile phone fragrance accessory set as claimed in claim 3, further comprising:
   a connection chain, wherein the connection block is connected to the first connecting part through the connection chain with an end of the connection chain connected to the connection ring of the connection block, and another end of the connection chain connected to the first connecting part.

5. The mobile phone and mobile phone fragrance accessory set as claimed in claim 1, further comprising:
   a phone lanyard adapter, having a connection ring, wherein the phone lanyard adapter is clamped between the mobile phone and a mobile phone case that houses the mobile phone, while the connection ring threads out from the mobile phone case at a position corresponding to a charging port of the mobile phone; wherein
   the first connecting part is a ring-shaped connecting part, and the fixing component is connected to the mobile phone through the phone lanyard adapter connected by the first connecting part.

6. The mobile phone and mobile phone fragrance accessory set as claimed in claim 5, further comprising:
   a connection chain, wherein the phone lanyard adapter is connected to the first connecting part through the connection chain with an end of the connection chain connected to the connection ring of the phone lanyard adapter, and another end of the connection chain connected to the first connecting part.

* * * * *